United States Patent
Kolm

[15] 3,703,958
[45] Nov. 28, 1972

[54] EDDY CURRENT APPARATUS AND METHOD OF APPLICATION TO A CONDUCTIVE MATERIAL

[72] Inventor: Henry H. Kolm, Wayland, Mass.

[73] Assignee: Massachusetts Institute of Technology, Cambridge, Mass.

[22] Filed: Aug. 11, 1969

[21] Appl. No.: 849,128

Related U.S. Application Data

[63] Continuation-in-part of Ser. No. 761,048, Sept. 20, 1968, Pat. No. 3,567,026.

[52] U.S. Cl. ................210/65, 72/56, 204/186, 210/42, 317/123, 324/40
[51] Int. Cl. ........B03c 5/00, B01d 37/00, B21d 26/02
[58] Field of Search ........210/42, 65, 222, 223; 55/3; 204/186–191, 193, 309; 72/56

[56] References Cited

UNITED STATES PATENTS

| | | |
|---|---|---|
| 3,092,165 | 6/1963 | Harvey .................72/56 X |
| 3,108,325 | 10/1963 | Harvey .................72/56 X |
| 3,210,842 | 10/1965 | Schwinghamer.........72/56 X |
| 3,212,311 | 10/1965 | Inoue....................72/56 X |
| 3,214,832 | 11/1965 | Schwinghamer.........72/56 X |
| 3,365,522 | 1/1968 | Inoue....................72/56 X |
| 2,834,470 | 5/1958 | Jones...................210/222 |
| 3,277,631 | 10/1966 | Sunnen....................55/3 |
| 3,279,602 | 10/1966 | Kottenstette et al........210/42 |
| 3,466,154 | 9/1969 | Masao Holi et al.......210/222 |

Primary Examiner—J. H. Mack
Assistant Examiner—T. Tufariello
Attorney—Thomas Cooch, Martin M. Santa and Robert Shaw

[57] ABSTRACT

Eddy current apparatus is disclosed for applying a force to a conductive material. The apparatus employs two magnetic fields. The first, a background or soaking field, is continuous or slow rising and has a skin depth that is greater than the dimension of the material in the direction of field penetration. The second is fast-rising and has a skin depth that is less than said dimension. The two fields are timed or phased and oriented with respect to each other to produce the force in a desired direction. Thus, the conductive material can be particles in a slurry or a sheet of conductive material and the force applied thereto can be toward or away from the field source depending upon the timing or phasing of the fields and the orientation thereof.

14 Claims, 5 Drawing Figures

INVENTOR:
HENRY H. KOLM
BY
ATTORNEY

INVENTOR:
HENRY H. KOLM
BY Robert Shaw
ATTORNEY

EDDY CURRENT APPARATUS AND METHOD OF APPLICATION TO A CONDUCTIVE MATERIAL This is a continuation-in-part of application Ser. No. 761,048 filed on Sept. 20, 1968 now U.S. Pat. No. 3,567,026 in the name of the present inventor and is being filed as a result of a requirement for division.

This invention was made in the course of work performed under a contract with the Air Force Office of Scientific Research.

The present invention relates to electric eddy-current apparatus adapted to apply a force to a conductive material and employs two magnetic fields, the timing and orientation of the fields determining whether the resulting force produced by the apparatus is one of attraction or repulsion.

The present disclosure is concerned, broadly, with eddy-current apparatus that may be used, for example, to apply forces to conductive materials such as conductive components in a slurry or other fluid carrier or to conductive tubes, plates and the like. The apparatus, as discussed in said application, is capable of applying unidirectional forces upon materials toward or away from the eddy current source, as the case may be, and the magnitudes of such forces are far greater than have been heretofore possible. As further discussed, it can be employed to remove conductive particles from a fluid medium, but is useful, as well, for shearing metal and, also, as hammer apparatus for forming metal. In the latter situation the metal can be deformed (as well as formed) by an accurately reproducible force for proof-loading or for non-destructive testing of metal joints and the like.

Accordingly, an object of the present invention is to provide a novel eddy-current apparatus adapted to furnish unidirectional repulsive or attractive forces to conductive materials, the magnitude of such forces being far greater than have been heretofore possible.

A further object is to provide eddy current apparatus adapted to remove conductive particles or components from a fluid carrier, gas or liquid.

A still further object is to provide apparatus that may be used to deform and/or shear conductive plates, tubes and the like.

Other objects are discussed hereinafter and are particularly delineated in the appended claims.

By way of summary, the objects of the invention are attained, broadly, in double-field eddy current apparatus for applying a unidirectional force to a conductive material that comprises, in combination, coil means, a source of current adapted to connect to the coil means and produce thereby a magnetic field having a skin depth that is greater than the dimension of the material in the direction of field penetration, a source of abruptly rising current adapted to connect to the coil means and produce thereby a fast-rising magnetic field having a skin depth that is less than said dimension of the material.

The invention will now be discussed in connection with the accompanying drawing in which.

Figure 3:
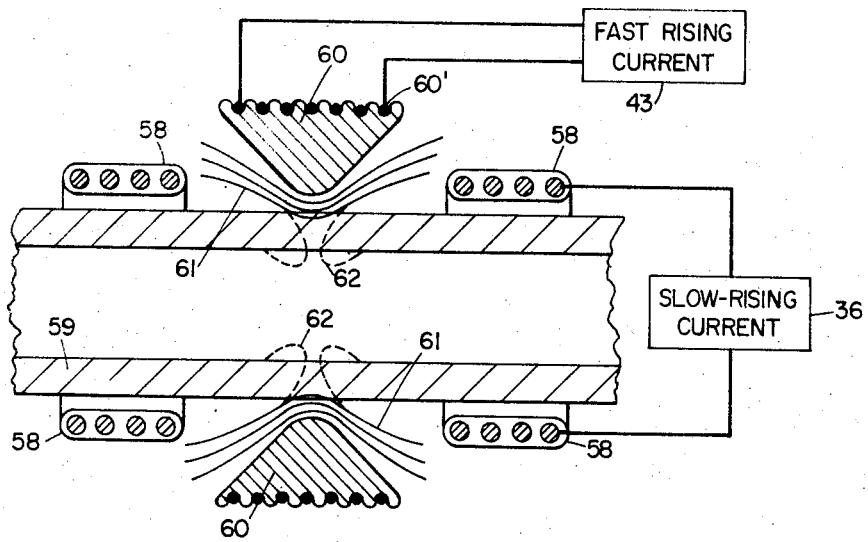
FIG. 3 is a schematic representation to show eddy current means analogous to that shown in FIG. 1 in an electromagnetic shear or hammer apparatus.
Figure 4:
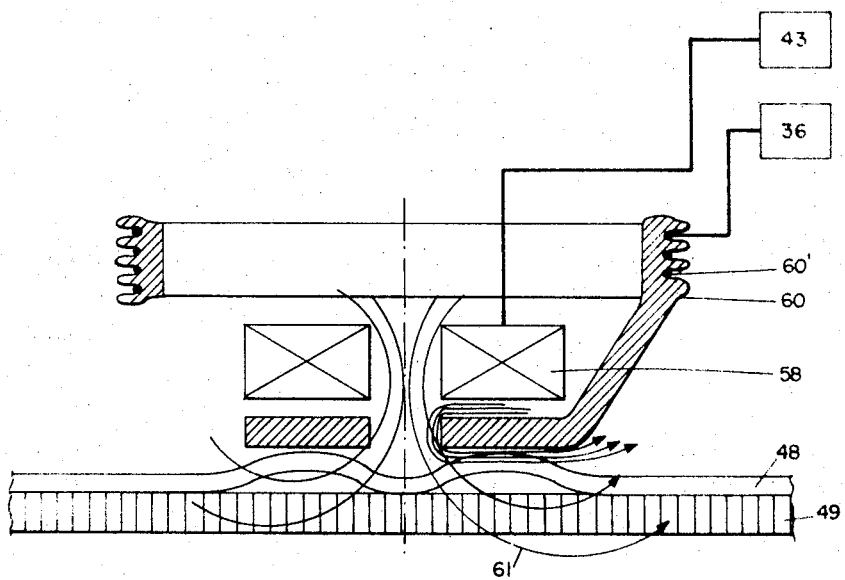
Figure 5:
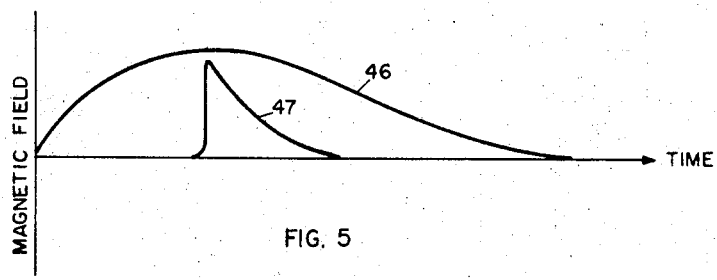

FIG. 4 is a schematic representation to show eddy current means for applying a traction force to a conductive skin bonded to a supporting structure for the purpose of proof-loading the skin bond so as to determine non-destructively whether the bond will withstand a minimum required force, and to accomplish this non-destructive test without access to the interior of the structure being tested; and FIG. 5 shows a preferred shape of magnetic pulsed fields applied by the eddy current means shown in FIGS. 3 and 4.

Figure 1:
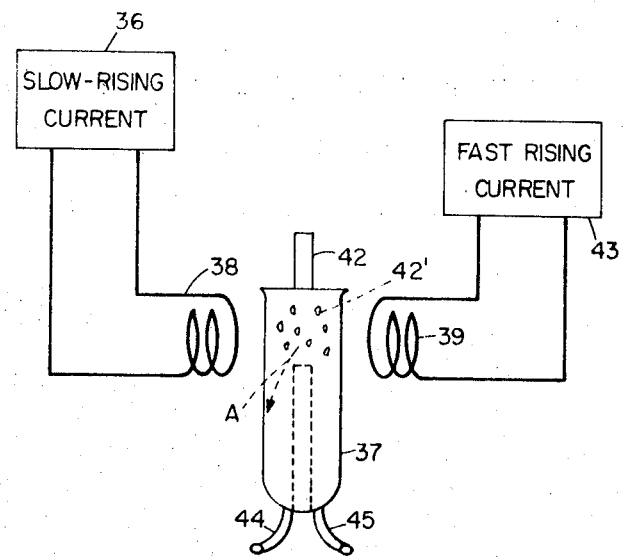
FIG. 1 is a schematic representation of eddy current apparatus used in connection with removal of conductive components or particles from a slurry.

Referring now to FIG. 1, eddy current apparatus is shown for applying a force to a conductive material 42' which in the embodiment of FIG. 1 comprises particles suspended in a non-conductive medium which may be a liquid or a gas carrier. Two periodically time varying magnetic fields are introduced to the medium in a manner later discussed herein and the timing and orientation of the fields with respect to one another determine whether the force thereby produced is toward or away from the source of the magnetic fields.

The apparatus shown schematically in FIG. 1 comprises a non-conductive tank 37 (having an inlet pipe 42) to receive a slurry and to remove therefrom conductive components whether magnetic or non-magnetic from the slurry. A slow rising field, as represented by the wave 40, is furnished by a coil 38 which is energized by a current source 36; and a fast rising field, as represented by the wave 41, is furnished by a coil 39 which is energized by a current source 43. The conductive components 42' (which may be small metal particles) within the slurry are propelled to travel in the direction of the arrow designated A to pass from the tank 37 through an outlet 44; the usable slurry passes through an outlet 45. The force of any conductive particle 42' will be to the left or right depending on whether the wave 40 leads or lags the wave 41 in time and on the relative orientation of the coils 38 and 39. Unlike devices with no background field or a continuous background field and in which the time varying field must be asymmetric to provide a unidirectional net force, the present device, though having symmetric fields, produces a unidirectional force. And the force is maximized because the instant at which the rate of change is maximal coincides with the instant at which the field is maximal. Thus, the induced eddy currents reach their maximum at a time when the magnetic field is maximum, which optimizes use of the potentially available force. The use of high intensity pulsed fields, since the background field is needed for only a brief instant of time, represents a substantial saving of power over a continuous background field. In addition, as explained herein, the period or rise time of the varying field is systematically matched to the object to be acted on, in such a way as to achieve the proper skin depth or penetration depth of the induced eddy currents. The eddy current apparatus discussed here represents an improvement over the prior art in that it uses two separately controlled pulsed or periodically varying magnetic fields, one having a substantially fast rise-time to induce eddy currents of appropriate skin depth in the particular object or particle to be acted on, and the other having a substantially slow rise time to allow a background field to penetrate into the object to be acted on. The fast rising pulse has a skin depth equal to or smaller than the characteristic dimensions of the object to be acted on in the direction of field penetration while the slow rising pulse has a skin depth substantially greater than the dimension of the object to be acted on in the direction of field penetration. The two pulsed or periodic magnetic fields are timed in such a way as to have an expedient time phase relationship with respect to each other, here shown to be $\pi/2$ radians, lead or lag, so that the abrupt rise coincides with the maximum or minimum of the sine wave and an expedient spatial relationship to one another in order to produce maximum force in the desired direction.

Figure 2:
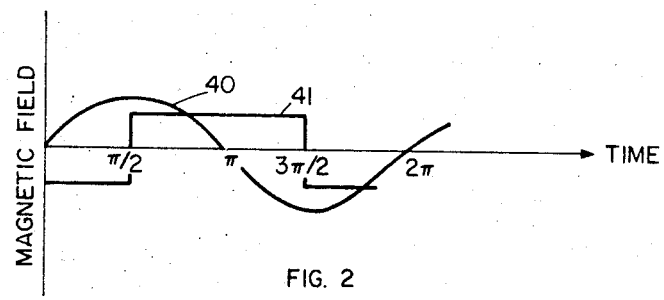
FIG. 2 is a graph showing a sinusoidal wave to provide a slow-rising magnetic field for the eddy current apparatus of FIG. 1 and a square wave to provide a fast-rising field therefor.

The sinusoidally alternating magnetic field 40 in FIG. 2, as mentioned, has a skin depth that is greater than the cross dimensions of the components 42'. The frequency of the current supply 36 is typically in the lower sonic range. The square wave alternating magnetic field 41, which has an amplitude that is, preferably, lower than the sinusoidal wave 40 but which is $\pi/2$ radians out of time phase therewith, provides, in combination with the field represented by the sinusoid 40, a force upon the components 42' far greater than might be furnished, for example, by a single eddy current field as might be provided by a current having a frequency in the upper sonic range and connected to either of the coils 38 and 39. The square wave is supplied by the coil 39 which is energized by the current source 43 to furnish a square wave 41 at the same frequency as the frequency of the sinusoidal wave 40; but, whereas the sinusoid is slow rising and in the low frequency used (i.e., in the lower sonic range) has a skin depth that is large compared to the characteristic dimensions of the components, the square wave is abruptly alternating or faster rising and has a skin depth that is less than the characteristic dimensions of the components. The slow rising field 40 acts as a pulsed background field, the fast rising field 41 being applied to furnish a rate of change that is maximal when the background field 40 is also maximal thereby effecting a maximum force upon the components.

The double pulse described herein is particularly useful to provide higher impulse forces in electromagnetic hammers and the like than have previously been attainable to deform or perforate conductive plates or as electromagnetic shears for cutting metal tubing, such as the tubing 59 in FIG. 3. In shearing devices the slow rising or soaking field current can be applied to a two-part coil 58, and the square wave field current can be applied to conductors 60' of the flux concentrator shown schematically at 60 disposed between the two parts of the coil 58. The concentrated flux lines are represented by the lines marked 61 and the shear lines of the tube 59 are shown dotted at 62. Electromagnetic hammers can have similar coil arrangements for concentrating flux. The force upon the conductive plate or tubing will be in one direction or the other in accordance with the timing and orientation of the pulsed fields, as mentioned, and the pulses can each be one-half cycle of the field waves 40 and 41 produced, for example, by two capacitor banks, of the type disclosed in application Ser. No. 849,126 of the present inventor filed herewith, and now abandoned, with appropriate switching; and each square-shaped pulse can be replaced by a fast-rising, slower-falling spike shaped pulse to provide higher forces.

FIG. 3 illustrates an application in which eddy current means is used to sever metal, notably to shear off a metal tube. The apparatus according to the invention can also be used to deform metal, either elastically or plastically, and either in a direction away from the eddy current producing means, or in a direction toward the eddy current producing means, as previously discussed herein; that is to say, the force exerted may be repulsive or attractive with respect to the coil means. A particularly important application, and one which cannot be served by any known device, is illustrated in FIG. 4. It involves the proof-loading of a conductive skin bonded to a supporting structure, such as the aluminum or titanium skin of an aircraft or space vehicle bonded to structural members or honeycomb stiffening panels, so as to determine, non-destructively, whether an adhesive or other bond will withstand the minimum required force, and to do so without access to the interior of the structure. In FIG. 4, elements that perform similar functions to the elements in FIG. 3 have the same numerals applied thereto as are applied in FIG. 3. The device shown in FIG. 4 comprises coil means 58 for generating the slow, penetrating background field, separate coil means consisting of a flux concentrator 60 and winding 60' to generate the fast, eddy-current inducing field, and the current sources 36 and 43 for the slow and fast rising pulses, respectively. The skin labeled 48 has been deformed to show a raised, ring-shaped blister, indicating a poor bond between the skin 48 and a supporting structure 49 below. It may be expedient to provide a flux shield (not shown) between the two coil means to minimize inductive coupling between them. The pulse shown at 46 in FIG. 5 performs the background or soaking function performed by the field represented by the wave 40 in FIG. 2 and the fast-rising, slower-falling, spike-shaped pulse designated 47 performs the function of the square-wave 41, except that the representation in FIG. 5 is that of a single pulse of both fields and not the multiple cycles shown in FIG. 2. The pulsed fields represented by FIG. 5 are particularly desirable for providing the percussive forces necessary in the shearing and hammer functions discussed in connection with FIGS. 3 and 4.

The background or soaking field, as mentioned, to be effective, must be slow rising to provide a skin depth $\gamma$ that is large compared to the characteristic dimension of the components on other conductive material acted upon in the direction of field penetration; and the other field must be fast rising to provide a skin depth $\gamma$ that is comparable to the characteristic dimension of the material acted upon in the direction of field penetration; the skin depth, as is known to workers in this art (see, for example, *Radio Engineers' Handbook*, Terman, First Edition, McGraw-Hill Company, Inc., 1943, pages 34–35) being found in the following relationship:

$$B_x = B_o \cdot e^{-x/\delta}, \qquad (1)$$

where $B_o$ is the intensity of the eddy-current inducing magnetic field at the surface of the material acted upon, $e$ is the base of natural logarithms, and $B_x$ is the attenuated intensity (amplitude) of the field measured at a distance of penetration $x$ into said material. In penetrating into said material, the magnetic field is attentuated exponentially at such a rate that it will have decreased to $1/e$ of its initial intensity at a penetration depth which is customarily called the "skin depth." This skin depth is inversely proportional to the square root of the product of the conductivity $k$ of the material and the frequency $f$ of the alternating magnetic field $B_o$:

$$\gamma \sim 1/\sqrt{k \cdot f} \qquad (2)$$

The attenuation of this field as it penetrates into the conducting material is caused by induced eddy currents, and it is the intended purpose of said alternating field to induce such eddy currents which will react to produce a force upon the conductive material. It should be appreciated from the foregoing explanation that while skin depth is defined in terms of frequency, it is the rate of change of field or rise time that determines penetration and while the alternating fields depicted in FIG. 2 are periodic and can be said to have a frequency the pulsed fields of FIG. 5 are not periodic. Yet the effect of the background or soaking field 46 of FIG. 5 and the spiked field 47 have similar effect respectively of the fields 40 and 41 in FIG. 2 because of the similarity of relationship of rise time to the material acted upon.

It is noted in said application, Ser. No. 849,126 that a rise time of 100 microseconds of a magnetic field acting upon a plate 2 millimeters thick (0.080 inches) provides a pulse that has a skin depth that is less than the thickness dimension (i.e., the characteristic dimension of the plate in the direction of the field penetration); and it is discussed previously that the soaking field can have frequencies in the lower sonic range (i.e., 50 to about 400 H) depending on the conductivity and thickness of the material. Magnitudes of the fields used will depend upon the material acted upon, that is, its conductivity, thickness, etc., and the desired force to be applied. Background fields of the order of the 12,000 gauss fields mentioned in said application may be used, but the 100,000 gauss field mentioned will provide higher forces and are well within present technological capability, particularly in the pulsed mode discussed herein. On the other hand, the fast-rising field is preferably lower in magnitude than the soaking field, as previously mentioned.

Modifications of the invention herein described will occur to those skilled in the art.

What is claimed is:

1. Eddy current apparatus for applying a unidirectional force to a conductive material that comprises, in combination, coil means, a source of time varying electric current connected to the coil means and adapted to produce in the energized coil means a slow rising background magnetic field, a source of abruptly rising current connected to the coil means adapted to produce in the energized coil means a fast-rising eddy-current inducing magnetic field, the two time varying magnetic fields, upon introduction to said material being timed and oriented with respect to each other to effect electromagnetic interaction between the eddy currents induced in the conductive material and the background field to produce either a unidirectional repulsive force or a unidirectional attractive force depending on the timing and orientation of said fields.

2. Eddy current apparatus for applying a unidirectional force to a conductive material that comprises, in combination, means producing and introducing to the conductive material a background magnetic field having a skin depth much greater than the dimension of the conductive material in the direction of field penetration so as to penetrate through the conductive material, and means producing a second magnetic field having a skin depth that is comparable to or less than the dimension of the conductive material in the direction of field penetration thereby to induce eddy currents therein the second field upon introduction to said material being appropriately oriented with respect to the background field that interaction between the eddy currents induced thereby and the background field will produce a unidirectional force upon the conductive material in the desired direction.

3. A method of applying a unidirectional force to a conductive material that comprises, introducing to the conductive material concurrent magnetic fields, one of the fields having a rise time that is slow enough to provide a skin depth that is substantially greater than the characteristic dimensions of the conductive material in the direction of field penetration and the other of the fields having a rise time that is short enough to provide a skin depth that is either comparable or less than to the characteristic dimension of the conductive material in the direction of field penetration.

4. A method as claimed in claim 3 in which the field having the slow rise time is a sinusoidally varying field in the lower sonic frequency range and the field having the fast rise time is a square wave, the square wave being periodically varying at a frequency equal to that of the sinusoidally varying field but being $\pi/2$ radians out of time phase therewith.

5. A method as claimed in claim 3 that includes applying as one of the concurrent fields a slow rising pulsed field to act as a background field.

6. A method as claimed in claim 5 that includes applying as the other of the concurrent fields an abruptly rising, slower-falling spike-shaped pulse to occur at the time when the background field is maximal.

7. A method as claimed in claim 3 in which the two concurrent magnetic fields upon introduction to said material are timed and oriented with respect to each other to produce either a repulsive force or an attractive force depending on the timing and orientation of said fields.

8. Electric eddy-current apparatus operable to apply a unidirectional force to an electrically conductive material, that comprises, means for introducing to the conductive material concurrent time-varying fields, one of the fields being a sinusoidally varying field in the lower sonic frequency range and no greater than about 400 Hz and the other field being a square wave having a frequency equal to that of the sinusoidally varying field but out of time phase therewith.

9. Apparatus as claimed in claim 8 in which the means for producing the magnetic field comprises: first and second coils, a source of sinusoidally varying current electrically connected to the first coil to provide the sinusoidally varying field, and a source of square-wave current connected to the second coil to provide the square-wave field, the currents in the coils and the orientation of the coils with respect to one another being such that either a repulsive force or an attractive force can be applied to said material depending upon the timing and orientation of the magnetic fields produced by the electrically energized coils.

10. Apparatus as claimed in claim 9 in which the square wave field is $\pi/2$ radians out of time phase with the sinusoidally varying field.

11. A method of applying a unidirectional force to a conductive material, that comprises, establishing within a region of the conductive material a background magnetic field, the background field having a skin depth that is much greater than the dimension of the conductive material in the direction of field penetration, and introducing to said region a second, fast-rising and slow-falling, or slow-rising and fast-falling single pulse or repetitively pulsed magnetic field, the skin depth corresponding to the fast rise or fast fall respectively being comparable to or less than said dimension and the skin depth corresponding to the slow fall or slow rise respectively being large compared to said dimension, thereby to induce eddy currents within the conductive material which interact electromagnetically with the background field to produce a net force on the conductive material, the fields being oriented with respect to each other so as to produce a force in a desired direction.

12. Eddy current apparatus for applying a unidirectional force to a conductive material that comprises, in combination, means for producing and introducing to the material a background magnetic field adapted to penetrate through the magnetic material, and means for producing and introducing to the conductive material another magnetic field having a skin depth that is comparable to or less than the dimension of the conductive material in the direction of field penetration to induce eddy currents within the material which interact electromagnetically with the background field to produce a net force on the conductive material, the magnetic fields being oriented with respect to each other to effect interaction between the background field and the induced eddy currents so as to produce a unidirectional force in a desired direction.

13. Eddy current apparatus as claimed in claim 12 in which the means for producing and introducing the eddy-current inducing field produces and introduces to the conductive material a spike-shaped pulse as shown in FIG. 5 of the drawing hereof or a series of pulses like said spike-shaped pulse.

14. Eddy current apparatus as claimed in claim 12 in which the means for producing and introducing the eddy-current inducing field produces and introduces to the conductive material a pulse whose rise time differs substantially from its fall time thereby to produce said unidirectional force.

* * * * *

UNITED STATES PATENT OFFICE
CERTIFICATE OF CORRECTION

Patent No. 3,703,958              Dated    November 28, 1972

Inventor(s)    Henry H. Kolm

It is certified that error appears in the above-identified patent and that said Letters Patent are hereby corrected as shown below:

In Figure 4, transpose the numerals "43" and "36" so that the numeral 36 indicates the upper right-hand block and the numeral 43 indicates the lower right-hand block in that figure.

Signed and sealed this 29th day of October 1974.

(SEAL)
Attest:

McCOY M. GIBSON JR.                  C. MARSHALL DANN
Attesting Officer                    Commissioner of Patents